2,743,300
PRODUCTION OF DIMETHYL PHENYL CARBINOL

George G. Joris, Madison, and William D. Griffin, Morristown, N. J., assignors to Allied Chemical & Dye Corporation, New York, N. Y., a corporation of New York No Drawing. Application June 23, 1951,
Serial No. 233,245

7 Claims. (Cl. 260—618)

This invention relates to production of dimethyl phenyl carbinol from cumene and its partial oxidation product cumene hydroperoxide.

Oxidations of arylalkyl hydrocarbons including cumene, as heretofore practiced, such as oxidations by air in presence of catalysts such as compounds of heavy metals, have usually formed considerable proportions of oxidation-dehydrogenation products, e. g. ketones, in addition to carbinols.

We have now discovered a specific catalyst, and process conditions for oxidation of specifically cumene in presence of said catalyst, whereby with high yields and rapid oxidation rate, dimethyl phenyl carbinol is formed as the principal oxidation product, e. g. up to 90–95% by weight of the oxidized products and up to 50–80% by weight of the reaction mixture including unoxidized cumene. This same catalyst decomposes cumene hydroperoxide into dimethyl phenyl carbinol as will be more fully described hereinafter.

In our process of oxidation the catalyst is the dioxide of lead, $PbO_2$; liquid phase conditions are maintained; and preferably temperatures during at least about ⅔ of the oxidation period are maintained in the range from about room temperatures (25° C.) to about 100° C. Very good results are obtained using temperatures of about 85° C. Higher temperatures can be used during the remainder of the oxidation period, e. g. at the end of the period to effect decomposition of any cumene hydroperoxide which may have accumulated. Our process is remarkable for the high rates of oxidation obtainable, particularly in view of the low temperatures employed as above specified. Obtaining high oxidation rates at relatively low temperature such as used in our process is advantageous in minimizing problems of recovery of vaporized unoxidized cumene, especially when high gas flow rates are maintained.

When temperatures are maintained during oxidation by our process substantially below 85° C., e. g. at 50° C. or below, substantial quantities of cumene hydroperoxide usually accumulate in the reaction mixtures. At temperatures such as 85° C. and above, e. g. up to the boiling point of the reaction mixture, this cumene hydroperoxide rapidly and smoothly decomposes under our process conditions with formation of dimethyl phenyl carbinol therefrom and from any cumene present. According to one preferred embodiment of our process, we oxidize cumene at temperatures maintained for at least the first 10 hours substantially in the range from about 30° C. to about 50° C. and then maintained above 50° C. for not more than 5 hours, thereby decomposing cumene hydroperoxide present in the oxidation products with formation of dimethyl phenyl carbinol therefrom and from cumene in the reaction mixture.

Pressures employed in our process can be about atmospheric or above; and elemental oxygen employed can be purified oxygen or oxygen diluted with other gases, e. g. gases present in air, recycled exit gases from oxidation of cumene in accordance with the present process, etc. Use of superatmospheric pressures and/or of purified elemental oxygen increases rates of reaction obtainable when flowing given volumes per hour of gas through the reaction mixture, thereby increasing space-time yields and ratios of oxidation products:vaporized unreacted cumene; and faster flow rates give higher oxidation rates.

Specific examples of cumene oxidation in accordance with our process are presented in the tables below, which examples are illustrative of our invention but are not to be regarded as limiting the same.

The tests summarized in the tables below were carried out by introducing commercial cumene and 0.5% by weight of commercial lead dioxide into a reaction vessel provided with thermometer, reflux condenser for returning vaporized cumene to the reaction vessel and trap for removing water from the reflux. Air was bubbled at about atmospheric pressure at a rate of 10 liters per 100 cc. of reaction mixture per hour through the reaction vessel in such a manner as to promote dispersion of the catalyst. After the time intervals shown in the tables the resulting products were analyzed for weight percent of dimethyl phenyl carbinol (percent DMPC); weight percent of acetophenone (percent AcPh); weight percent of cumene hydroperoxide (percent CHP) and weight percent of unoxidized cumene (percent cumene). With the procedure employed, cumene losses were negligible.

Cumene oxidations at a series of temperatures

| | Time, hr. | Percent DMPC | Percent AcPh | Percent CHP | Percent cumene |
|---|---|---|---|---|---|
| 103° C | 5 | 20 | 3 | 0.2 | 78 |
| | 20 | 48 | 18 | 0.3 | 35 |
| | 45 | 52 | 21 | 0 | 27 |
| 115° C | 5 | 19 | 2 | 0.3 | 79 |
| | 20 | 54 | 12 | 0.9 | 32 |
| | 45 | 60 | 25 | 0.1 | 15 |
| 100° C | 5 | 15 | 1 | 0.3 | 84 |
| | 20 | 42 | 4 | 0.7 | 54 |
| | 45 | 71 | 9 | 2.0 | 18 |
| 85° C | 5 | 15 | 1 | 0.7 | 83 |
| | 20 | 54 | 3.5 | 0.8 | 40 |
| | 45 | 79 | 9.3 | 0.9 | 11 |
| 50° C | 0 | 0 | 0 | 1 | 99 |
| | 5 | 10 | 0 | 5 | 85 |
| | 10 | 25 | 1 | 7 | 67 |
| | 25 | 49 | 2 | 13 | 37 |
| | 50 | 58 | 5 | 20 | 17 |
| 25° C | 0 | 0 | 0 | 1 | 99 |
| | 10 | 1 | 0 | 3 | 96 |
| | 30 | 9 | 0 | 7 | 83 |
| | 50 | 33 | 0.5 | 10 | 55 |
| | 100 | 58 | 2.5 | 17 | 23 |
| | 150 | 64 | 5 | 21 | 9 |
| | 200 | 66 | 6 | 25 | 2 |
| | 250 | 67 | 7 | 24 | 1 |
| | 300 | 69 | 10 | 20 | 0 |

It will be observed from the tables that the overall rate of cumene oxidation under our conditions is almost the same at temperatures as low as 50° C. as at the highest temperature shown, 130° C.; but at and below 100° C. the proportion of dimethyl phenyl carbinol and cumene hydroperoxide is 90–95% by weight of the oxidized products even when the cumene remaining unoxidized amounts to only 20% or less.

Cumene hydroperoxide can be grouped together with dimethyl phenyl carbinol as an oxidation product because as above stated, cumene hydroperoxide present in our reaction mixtures rapidly decomposes, at temperatures such as 85° C. and above, to form dimethyl phenyl carbinol and in so decomposing, promotes oxidation of cumene to additional dimethyl phenyl carbinol. This reaction can be represented by the equation:

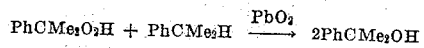

$$PhCMe_2O_2H + PhCMe_2H \xrightarrow{PbO_2} 2PhCMe_2OH$$

For example when cumene containing 14% by weight of cumene hydroperoxide was heated at bath temperature of 100° C., in presence of 0.5% by weight of lead dioxide, rapid decomposition of the cumene hydroperoxide with temperature rise to 110° C. was observed during the first 10 minutes of heating. Air was bubbled through the reaction mixture for 5 hours at 100° C. as in the above example. At the end of this 5 hour reaction period at 100–110° C., substantially all the cumene hydroperoxide had decomposed and the reaction mixture contained 40% by weight of dimethyl phenyl carbinol, 3% by weight of acetophenone and 55% by weight of unreacted cumene. Comparison of these results with the above tabulation brings out the effectiveness of our catalyst at temperatures such as 100° C. in decomposing cumene hydroperoxide to dimethyl phenyl carbinol and in simultaneously promoting oxidation of cumene to additional dimethyl phenyl carbinol.

Lead oxides such as red lead oxide ($Pb_3O_4$) and litharge (PbO) do not show the unusual effects of lead dioxide for oxidation of cumene. The following table compares these lead oxides with lead dioxide at temperature of 100° C. using the procedure set forth above in the example, except that the lead compounds are employed in amounts of 1 gram per 100 cc. of starting cumene.

*Lead oxide catalyzed cumene oxidations at 100° C.*

| Hrs. | Percent DMPC | | | Percent AcPh | | | Percent CHP | | | Percent Cumene | | |
|---|---|---|---|---|---|---|---|---|---|---|---|---|
| | PbO | $PbO_2$ | $Pb_3O_4$ | PbO | $PbO_2$ | $Pb_3O_4$ | PbO | $PbO_2$ | $Pb_3O_4$ | PbO | $PbO_2$ | $Pb_3O_4$ |
| 0 | 0 | 0 | 0 | 0 | 0 | 0 | 1.1 | 1.1 | 1.1 | 99 | 99 | 99 |
| 5 | 0 | 17 | 0 | 0 | 1 | 0 | 10 | 0.2 | 9 | 87 | 81 | 91 |
| 10 | 8 | 29 | 3 | 1 | 2.5 | 0 | 13 | 0.4 | 13.5 | 69 | 68 | 84 |
| 20 | 39 | 48 | 9 | 3 | 8 | 1 | 16 | 0.8 | 20 | 42 | 42 | 70 |
| 30 | 47 | 62 | 16 | 5 | 12 | 2 | 18 | 1.0 | 23 | 28 | 23 | 57 |
| 40 | 51 | 72 | 25 | 8 | 14 | 4 | 20 | 1.2 | 24 | 20 | 10 | 43 |
| 48 | 53 | 79 | 35 | 10 | 15 | 5 | 22 | 1.3 | 25 | 15 | 5 | 35 |

It will be noted that even at 100° C., cumene hydroperoxide accumulates in presence of $Pb_3O_4$ and PbO; so that it can be seen that these materials do not resemble $PbO_2$ in its activity for decomposing cumene hydroperoxide. Accordingly even though overall oxidation rates with PbO at 100° C. approximate rates with $PbO_2$, the rates of forming dimethyl phenyl carbinol in presence of PbO are considerably lower than in presence of $PbO_2$.

Overall oxidation rates are relatively low at 100° C. in presence of $Pb_3O_4$ and cumene hydroperoxide accumulates in its presence as when PbO is catalyst.

At 30° C. overall oxidation rates using $PbO_2$ catalyst far surpass those with the other two compounds. Oxidation of cumene in presence of $PbO_2$ was practically complete when, in presence of PbO or $Pb_3O_4$, more than 90% of the starting cumene was still unoxidized.

The substitution of even closely related phenyl-alkyl hydrocarbons for cumene in our oxidation process does not produce comparable results to those obtained with cumene. Ethylbenzene and para-cymene, for example, oxidized under conditions the same as shown above for cumene, required 3–6 times as long, depending on temperature used and percent of hydrocarbon oxidized, to reach a given percentage of hydrocarbon oxidized. Moreover considerable proportions of ketones were formed. For example about 25% by weight of ketone was found in the oxidized products from p-cymene and 50% and more from ethylbenzene, in oxidations of ethylbenzene and para-cymene employing conditions of the above tables under which not more than about 10% of ketone was obtained in the oxidized products from cumene.

Proportions of catalyst employed in our process can be in the usual ranges of catalytic quantities, such as 0.05–10% by weight, and preferably are between about 0.1 and about 5% by weight.

The oxidation in accordance with our process can be stopped when desired, but in view of its speed and selectiveness even at dimethyl phenyl carbinol concentrations of 50% by weight and above, we generally prefer to carry our process to at least 50% by weight of dimethyl phenyl carbinol in the reaction mixture. If desired the process can be stopped while cumene hydroperoxide is still present in substantial quantities in the reaction mixture, but in view of the ready decomposition of cumene hydroperoxide in presence of our catalyst with production of additional dimethyl phenyl carbinol as above described, we generally prefer to effect decomposition of any accumulated cumene hydroperoxide by heating at temperatures above about 50° C., e. g. about 100° C. as above described, at least at the end of the oxidation period.

We claim:

1. Process for oxidizing cumene to mainly dimethyl phenyl carbinol which comprises contacting liquid cumene with at least one material of the group consisting of cumene hydroperoxide and elemental oxygen in presence of lead dioxide catalyst in amounts of at least 0.05% by weight and continuing said contact and maintaining temperatures sufficiently elevated to decompose cumene hydroperoxide present in the reaction mixture.

2. Process as defined in claim 1 wherein during at least the first ⅔ of the oxidation period elemental oxygen is employed as oxidizing agent and temperatures are substantially maintained between about 25° C. and about 100° C. and the oxidation is terminated when the oxidation reaction mixture contains not more than about 10 percent by weight of acetophenone and the unoxidized cumene amounts to about 20–50% by weight of the oxidation reaction mixture.

3. Process as defined in claim 2 wherein air is the source of elemental oxygen and reaction is carried to at least about 50% by weight of dimethyl phenyl carbinol in the reaction mixture.

4. Process as defined in claim 1 wherein lead dioxide quantities are between about 0.1 and about 5% by weight of the reaction mixture; during at least the first 10 hours of the oxidation period air is employed as oxidizing agent and temperatures are maintained in the range between about 30° C. and about 50° C.; the oxidation is terminated when the oxidation reaction mixture contains not more than 5 percent by weight of acetophenone and the unoxidized cumene amounts to about 20–50% by weight of the oxidation reaction mixture; and thereafter accumulated cumene hydroperoxide is substantially all decomposed by heating the resulting catalyst-containing reaction mixture per se for not more than 5 hours at temperatures in the range from above 50° C. to the boiling point of the reaction mixture.

5. Process for production of dimethyl phenyl carbinol which comprises heating cumene hydroperoxide and cumene in liquid phase at temperatures above 50° C. in presence of at least about 0.05% by weight lead dioxide, until substantial decomposition of cumene hydroperoxide and simultaneous oxidation of cumene have been effected to produce mainly dimethyl phenyl carbinol from both the decomposition reaction and the oxidation reaction.

6. Process for oxidizing cumene to a mixture of cumene hydroperoxide, dimethyl phenyl carbinol and unoxidized cumene, substantially free of acetophenone, which comprises contacting cumene in liquid phase with air at temperatures in the range from about 30° to about 50° C. while maintaining lead dioxide dispersed in the oxidation reaction mixture in amounts between about 0.1% and about 0.5% by weight, and terminating the oxidation when the oxidation reaction mixture contains not more than about 5% by weight of acetophenone and the unoxidized cumene amounts to about 20–50% by weight of the oxidation reaction mixture.

7. In a process of oxidizing cumene in liquid phase by elemental oxygen to products comprising cumene hydroperoxide, and decomposing cumene hydroperoxide thus formed to mainly dimethyl phenyl carbinol by subjecting the oxidation reaction mixture to heat, the improvement which comprises maintaining lead dioxide catalyst present in amounts of at least about 0.05% by weight during said oxidation and said decomposition reactions.

References Cited in the file of this patent

UNITED STATES PATENTS

| | | |
|---|---|---|
| 2,302,466 | Palmer et al. | Nov. 17, 1942 |
| 2,447,400 | Emerson et al. | Aug. 17, 1948 |
| 2,548,435 | Lorand et al. | Apr. 10, 1951 |
| 2,655,545 | Bruning et al. | Oct. 13, 1953 |
| 2,687,438 | Lorand et al. | Aug. 24, 1954 |

OTHER REFERENCES

Fordham et al.: Canadian Journal Research, vol. 27B (1949), pgs. 943–960 (18 pgs.).